United States Patent Office 3,091,964
Patented June 4, 1963

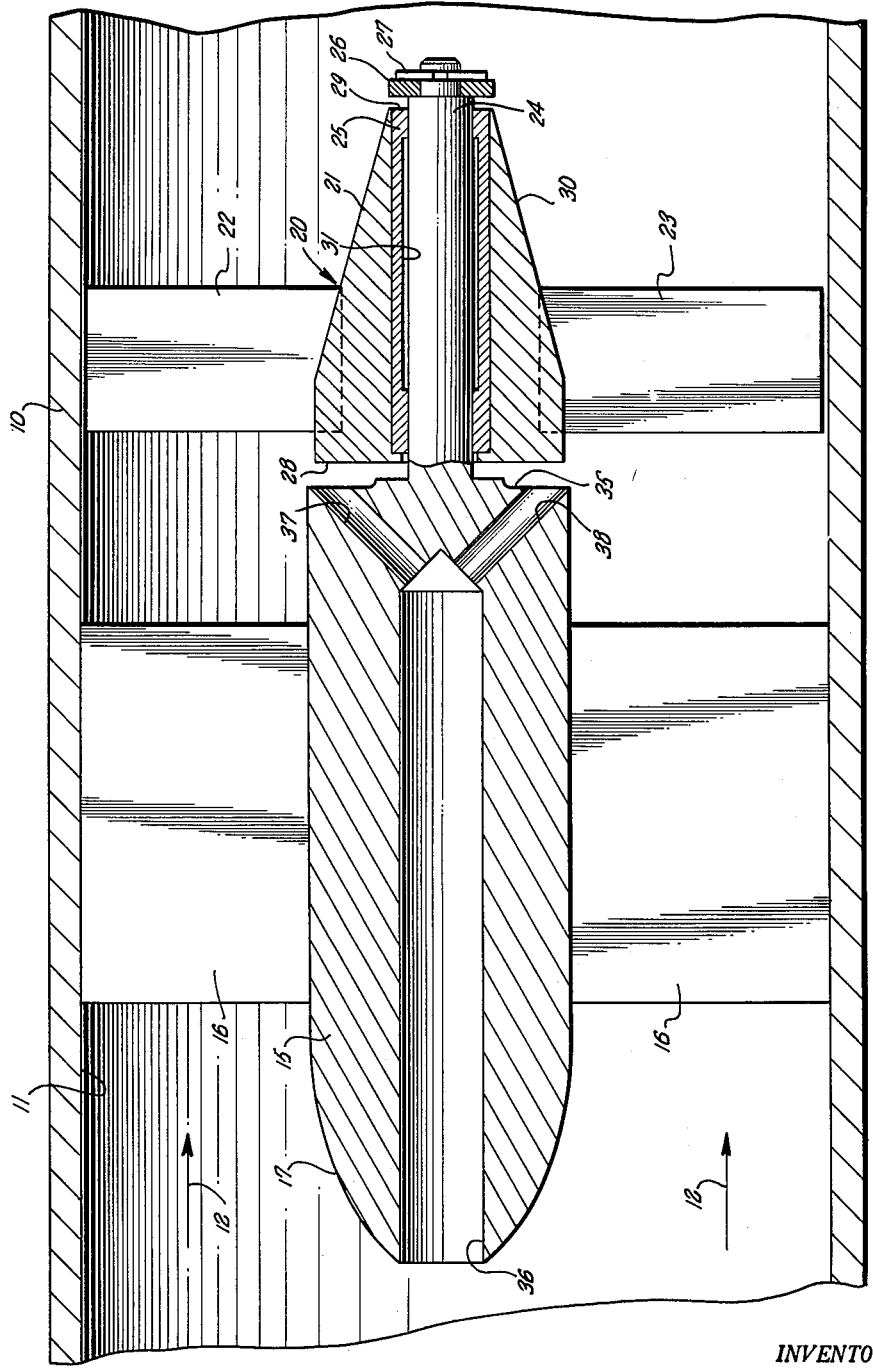

3,091,964
ROTOR SUSPENSION FOR FLOW METER
Edward E. Francisco, Jr., Woodland Hills, Calif., assignor, by mesne assignments, to Hydropoise, Incorporated, Scottsdale, Ariz., a corporation of New Mexico
Filed Sept. 6, 1960, Ser. No. 54,267
6 Claims. (Cl. 73—231)

The invention relates to rotor flow meters and particularly to the suspension of the rotor.

Rotor flow meters comprise, broadly, a bladed rotor suspended or mounted rotatably in the fluid flow for rotation thereby. The speed of rotation of the rotor is correlative to the velocity of the fluid flow and hence to the volume of fluid flow. The speed of rotation of the rotor responsive to the fluid flow is measured and the volumetric flow rate determined therefrom.

The manner in which the rotor is suspended in the fluid flow is of considerable importance to the accuracy of the correlation between the rotational speed of the rotor and the velocity of the fluid flow and to the responsiveness of the rotational speed of the rotor to changes of the velocity of fluid flow. In particular, it is desirable to suspend the rotor in the fluid flow in such manner that the friction of the rotatable mounting of the rotor is minimal when the rotor is rotatively driven by the fluid flow.

The frictional drag between the rotor and its mounting when the rotor is rotatively driven by the fluid flow may be divided into that resulting from rotation of the rotor and that resulting from axial thrust forces exerted upon the rotor. Equalization of the thrust forces on the rotor eliminates the need for a thrust bearing between the rotor and its support and thus eliminates frictional drag on the rotor from this source.

The invention comprises structure which suspends the rotor in the fluid flow in such manner that axial thrust forces on the rotor are neutralized to eliminate the need for a thrust bearing between the rotor and its support during rotation of the rotor from fluid flow. The inventive apparatus provides such thrust-free suspension for the rotor through a large range of velocities of the fluid flow and for greater velocities of fluid flow, is simple and reliable, and has a self-cleaning function.

The apparatus of the invention comprises broadly a rotor flow meter housing defining an interior passage for flow of fluids therethrough, a rotor support disposed within the passage and fixed to the housing, a bladed rotor having a hub rotatably and slidably mounted on the downstream end of the rotor support for rotation in a plane transverse to the direction of fluid flow and for movement in the direction of its axis of rotation. The upstream face of the rotor hub is adjacent to the downstream face of the rotor support and is entirely covered by such face of the rotor support. The rotor support has an internal passage open to the upstream fluid flow at the upstream end of the support which extends through the rotor support to discharge ports in the downstream face of the rotor support adjacent to the upstream face of the rotor hub. When fluid flow is present, forces acting on the rotor which tend to cause it to move upstream on its mounting are counterbalanced by forces exerted on the upstream face of the rotor hub from jets of the fluid emanating from the discharge ports and impinging against the rotor. There is thus effected a balancing of axial thrust forces on the rotor which results in the rotor being suspended in the fluid flow rotatably in thrust-free condition.

The invention and its advantages will be fully understood from a reading of the following description taken in conjunction with the accompanying drawing, in which a longitudinal view, partially in section, of apparatus embodying the invention is shown.

Referring now to the drawing, 10 designates a fluid impermeable housing of a rotor fluid flow meter. The housing 10 defines an interior circular passage 11 for flow of fluids therethrough. The fluid flow through the passage 11 is in the direction indicated with the arrows 12.

A generally cylindrical elongated rotor support 15 is mounted centrally within the passage 11 in stationary position. The mounting of the rotor support 15 is effected by means of support struts 16 fixed to the rotor support and the housing and extending radially therebetween. The support struts have minimal area in a plane transverse to the direction of fluid flow in order to minimize obstruction of such flow. The upstream end of the rotor support 15 is streamlined at 17 in order to reduce turbulence of fluid flow resulting from positioning of the rotor support therein.

A rotor 20 is rotatably and slidably mounted on the downstream end of the rotor support 15. The rotor 20 includes a rotor hub 21 and a plurality of rotor blades, such as at 22 and 23, extending radially from the hub to close proximity with the surface of the passage 11. The rotor blades are angled relative to the axis of rotation of the rotor so that fluid flow in the direction indicated effects rotation of the rotor. The rotor is mounted for rotation in a plane transverse to the direction of fluid flow and also for axial movement along its axis of rotation. This mounting is effected with an elongated cylindrical stud 24 extending downstream centrally of the passage 11 from the downstream end 35 of the rotor support 15 on which the rotor hub 21 is rotatably and slidably mounted with a sleeve bearing 25. A stop washer 26 is removably secured on the downstream end of the stud 24 by means of a snap ring 27. Clearance is provided between the downstream end 29 of the rotor hub and the stop washer 26 in order that the rotor is free to slide on the stud 24 in the direction of its axis of rotation. The rotor hub 21 is generally circular and tapers conically at 30 as it extends downstream from the vicinity of its upstream end. The sleeve bearing is cylindrically recessed at 31 to clear the stud 24 in order to reduce friction between the bearing and the stud while still providing adequate support of the rotor on the stud by means of its end portions in rotatable sliding bearing engagement with the stud 24.

The upstream end of the rotor hub has a substantially planar face 28 oriented transversely to the direction of fluid flow. The face 28 is circular and substantially concentric with the axis of rotation of the rotor hub. The downstream end of the rotor support 15 has a substantially planar face 35 oriented transversely to the direction of the fluid flow. The face 35 is circular and substantially concentric with the axis of rotation of the rotor hub. The two faces 28 and 35 are disposed in juxtaposed axially spaced relation from each other. The diameter of the face 35 on the rotor support is slightly greater than the diameter of the juxtaposed face 28 on the rotor hub in order that the areal extent of the face 35 on the support completely covers the areal extent of the face 28 on the hub and extends annularly beyond the circumference of the face 28. The annular extension of the face 35 beyond the circumference of the face 28 on the hub has been found to be of importance to proper operation of the invention, but the two faces may be of the same diameter so that, although the face 35 completely covers the face 28, the face 35 does not extend beyond the face 28, this arrangement, however, resulting in a decrease of the advantageous results derived from the invention.

The rotor support 15 defines an internal passage 36 open to upstream fluid flow at the upstream end of the support and extending through the support to a plurality of discharge ports, such as the ports 37 and 38, communicating to the downstream face 35 of the support adjacent to the face 28 of the rotor hub. The passage 36 is disposed centrally in the passage 11. The discharge ports may be four in number arranged in the face 35 at ninety degree intervals from each other to be symmetrical about the axis of rotation of the rotor 20.

In operation, the reduction of the fluid flow area of the passage 11 resulting from the positioning of the rotor support 15 therein causes an increase in the velocity of the fluid flow, and hence a decrease in its pressure head, in the region of the rotor support and rotor 20. Downstream from the rotor 20, the constriction of the fluid flow area of the passage decreases, thus increasing the area of passage 11 available for fluid flow, and this results in a decrease in the velocity of the fluid flow, and hence an increase in its pressure head, downstream from the rotor in the region of the conical downstream extension 30 of the rotor hub 21. The low fluid pressure head upstream from the rotor and the high fluid pressure head downstream from the rotor result in a differential of pressure which urges the rotor 20 upstream. This net upstream thrust on the rotor is counterbalanced with buffering jets of the fluid emanating from the discharge ports, as 37 and 38, and impinging against the upstream face 28 of the rotor hub to produce a downstream thrust on the rotor. The buffering jets are effected not only by the velocity of the fluid entering the passage 36, but also because of the lower pressure head of the fluid in the region of the downstream face 35 of the rotor support than upstream of the rotor support. The upstream thrust on the rotor caused by the pressure head of the fluid is balanced by the downstream thrust on the rotor caused by the buffering jets with the consequence that axial thrust forces on the rotor are balanced and the rotor, in effect, "floats" rotatably on the stud 24 between the stop washer 26 and the downstream face 35 of the rotor support. As a result, thrust frictional drag between the rotor and its support is eliminated during operation. The buffering jets of the fluid issuing from the discharge ports tend to scour the rotor and result in a self-cleaning action of the apparatus which is advantageous for certain types of liquids, such as milk, which tend to produce deposits on metallic surfaces.

I claim:

1. In a rotor flow meter, a housing defining an interior passage for flow of fluids therethrough, said passage having an upstream end and a downstream end, a rotor support disposed within the passage and fixedly attached to the housing, the rotor support including a stud member extending from a downstream end of the support, the rotor support having an internal passage open to upstream fluid flow at an upstream end of the rotor support and extending toward the downstream end of the rotor support and a port extending from the downstream end of the support adjacent the stud member to communicate with the passage, a rotor hub, bearing means supporting the rotor hub on the stud for sliding movement along the stud and for rotation therearound in a plane transverse to the direction of fluid flow, said rotor hub having an upstream face that is smaller in cross-sectional area than the adjacent downstream face of the rotor support.

2. In a rotor flow meter, a housing defining an interior passage for flow of fluids therethrough, said passage having an upstream end and a downstream end, a rotor support disposed centrally within the passage and fixedly mounted on the housing in spaced relation from the surface of the passage to define a constricted area for fluid flow through the passage, the rotor support including a stud member extending from a downstream end of the rotor support, the rotor support having an internal passage open to upstream fluid flow at an upstream end of the rotor support and extending toward the downstream end of the support and a plurality of ports extending from the downstream end of the rotor support adjacent to the stud member to communicate with the passage, a rotor hub, bearing means for supporting the rotor hub on the stud member for sliding movement along the stud and for rotation therearound in a plane transverse to the direction of fluid flow, said rotor hub having an upstream face with an area smaller than the area of the adjacent downstream end of the rotor support.

3. In a rotor flow meter, a housing defining an interior passage for flow of fluids therethrough, said passage having an upstream end and a downstream end, a rotor support disposed centrally within the passage and fixedly mounted on the housing in spaced relation from the surface of the passage to define a constricted area for fluid flow through the passage, the rotor support having an internal passage open to upstream fluid flow at an upstream end of the rotor support and extending toward a downstream end of the rotor support and a port extending from the downstream end of the support to communicate with the passage, a rotor hub rotatably and slidably mounted on the downstream end of the rotor support for rotation in a plane transverse to the direction of fluid flow and for movement in the direction of its axis of rotation, said rotor hub having an upstream face with an area smaller than the area of the adjacent downstream end of the rotor support.

4. In a rotor flow meter, a housing defining an interior passage for flow of fluids therethrough, said passage having an upstream end and a downstream end, an elongated generally cylindrical rotor support disposed centrally within the passage and fixedly mounted on the housing in radially spaced relation from the surface of the passage to define a constricted area for fluid flow through the passage, the rotor support including a stud member extending from a downstream end of the rotor support, the support having an internal passage open to upstream fluid flow at an upstream end of the rotor support and extending toward the downstream end of the rotor support and a plurality of ports extending from the downstream end of the support adjacent to the stud member to communicate with the passage, a rotor hub rotatably and slidably mounted on the stud member for rotation in a plane transverse to the direction of fluid flow and for movement in the direction of its axis of rotation.

5. A rotor flow meter comprising a housing defining an interior passage for flow of fluids therethrough, said passage having an upstream end and a downstream end, an elongated generally cylindrical rotor support disposed centrally within the passage and fixedly mounted on the housing in spaced relation to the surface of the passage to define a ring-like space of reduced area for fluid flow, the downstream end of said rotor support being a circular face oriented transversely to the direction of fluid flow, a cylindrical shaft fixed to the downstream end of the rotor support and extending downstream centrally of the passage, said rotor support having an internal passage open to upstream fluid flow at an upstream end of the rotor support and extending toward the downstream end of the rotor support and a plurality of ports extending from the downstream end of the support adjacent the cylindrical shaft to communicate with the passage, a rotor hub rotatably and slidably mounted on the shaft, a stop on the downstream end of the shaft, said rotor hub having a circular face on its upstream end oriented transversely to the direction of fluid flow and juxtaposed to said face on the downstream end of the rotor support in spaced relation thereto and a substantially conical portion extending convergently downstream from the vicinity of the upstream end of the rotor hub, the diameter of the face on the upstream end of said rotor hub being less than the diameter of the juxtaposed face on the downstream end of said rotor support, and a plurality of rotor blades fixed to the rotor hub and extending radially therefrom toward the surface of the passage.

6. A rotor flow meter comprising a housing defining an interior passage for flow of fluids therethrough, said passage having an upstream end and a downstream end, an elongated generally cylindrical rotor support disposed centrally within the passage and fixedly mounted on the housing in spaced relation to the surface of the passage to define a ring-like space of reduced area for fluid flow, the downstream end of said rotor support being a circular face oriented transversely to the direction of fluid flow, a cylindrical shaft fixed to the downstream end of the rotor support and extending downstream centrally of the passage, said rotor support having an internal passage open to upstream fluid flow at an upstream end of the rotor support and extending toward the downstream end of the rotor support and a plurality of ports extending from the downstream end of the support adjacent to the cylindrical shaft to communicate with the passage, a rotor hub rotatably and slidably mounted on the shaft, a stop on the downstream end of the shaft, said rotor hub having a circular face on its upstream end oriented transversely to the direction of fluid flow and juxtaposed to said face on the downstream end of the rotor support in spaced relation thereto and a substantially conical portion extending convergently downstream from the vicinity of the upstream end of the rotor hub, the diameter of the face on the upstream end of said rotor hub being less than the diameter of the juxtaposed face on the downstream end of said rotor support, a plurality of rotor blades fixed to the rotor hub and extending radially therefrom toward the surface of the passage.

References Cited in the file of this patent

UNITED STATES PATENTS

| | | |
|---|---|---|
| 2,683,224 | Cole | July 6, 1954 |
| 2,709,775 | Potter | May 31, 1955 |
| 2,812,661 | Cox | Nov. 12, 1957 |